(12) United States Patent
Watarai

(10) Patent No.: US 7,650,814 B2
(45) Date of Patent: Jan. 26, 2010

(54) BICYCLE CABLE

(75) Inventor: Etsuyoshi Watarai, Izumi (JP)

(73) Assignee: Shimano Inc., Osaka (JP)

( * ) Notice: Subject to any disclaimer, the term of this patent is extended or adjusted under 35 U.S.C. 154(b) by 566 days.

(21) Appl. No.: 11/330,966

(22) Filed: Jan. 13, 2006

(65) Prior Publication Data
US 2006/0240702 A1    Oct. 26, 2006

(30) Foreign Application Priority Data
Apr. 21, 2005    (JP) .............................. 2005-123744

(51) Int. Cl.
*F16C 1/20* (2006.01)
(52) U.S. Cl. ..................................... 74/502.5
(58) Field of Classification Search ................ 74/500.5, 74/50.15 R, 501.6, 502.2, 502.4, 502.5, 502.6, 74/501.5 R
See application file for complete search history.

(56) References Cited

U.S. PATENT DOCUMENTS

| | | | | |
|---|---|---|---|---|
| 3,415,549 A | * | 12/1968 | Chatham | ..................... 403/197 |
| 4,304,148 A | * | 12/1981 | Hamman | ..................... 74/502.4 |
| 5,353,626 A | * | 10/1994 | Davidson et al. | ........... 74/502.6 |
| 5,809,840 A | | 9/1998 | Oda et al. | |
| 2004/0168857 A1 | * | 9/2004 | Kuo | ............................ 184/15.1 |

FOREIGN PATENT DOCUMENTS

| | | |
|---|---|---|
| DE | 299 13 061 U1 | 9/1999 |
| DE | 198 43 337 A1 | 3/2000 |
| EP | 0 816 695 A2 | 1/1998 |
| JP | 08-219139 A | 8/1996 |

\* cited by examiner

*Primary Examiner*—Vicky A Johnson
(74) *Attorney, Agent, or Firm*—Global IP Counselors, LLP

(57) ABSTRACT

A bicycle cable is provided with an outer casing, an inner wire extending through the outer casing, an inner sheath covering at least a portion of the inner wire that protrudes beyond the outer casing and at least one the inner sheath cap member cap member. The inner sheath cap member has a mounting section mounted to an end part of the inner sheath and a bottom section that is formed on one end of the mounting section. The bottom section has a cable passage hole with the inner wire can pass therethrough. The bicycle cable is configured to effectively suppress the intrusion of contaminants between the inner wire and the inner sheath, and thereby, prevent the inner wire from degrading and becoming difficult to move.

20 Claims, 8 Drawing Sheets

BICYCLE CABLE

CROSS-REFERENCE TO RELATED APPLICATIONS

This application claims priority under 35 U.S.C. § 119 to Japanese Patent Application No. 2005-123744. The entire disclosure of Japanese Patent Application No. 2005-123744 is hereby incorporated herein by reference.

BACKGROUND OF THE INVENTION

1. Field of the Invention

This invention generally relates to a bicycle cable. More specifically, the present invention relates to an inner sheath cap member that is configured to be attached to an end part of an inner sheath of a bicycle cable that has an outer casing, an inner wire passing through the outer casing, and an inner sheath configured and arranged to cover at least a portion of the inner wire that protrudes beyond the outer casing.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

One important part of the bicycle is the cable systems that interconnect "manually operated parts" to "cable-operated parts". In particular, the brake devices and the gear changing devices (which exemplify "cable-operated parts") of a bicycle are connected to the brake levers and the gear shift parts (which exemplify "manually operated parts") of the bicycle by Bowden-type bicycle cable systems. Thus, these Bowden-type bicycle cable systems include brake cables and gear shift cables. Conventional bicycle cable systems have, for example, a tubular outer casing and an inner wire that can be inserted into and passed through the outer casing. A conventional outer casing has a synthetic resin liner against which the outside surface of the inner wire slides, a flat steel wire wound helically onto the outside circumference of the liner, and a synthetic resin jacket that covers the outside circumference of the flat steel wire. A conventional inner wire is made of intertwined steel wire and has an anchor part configured to be anchored to a brake lever or gear shift part, the anchor part being fixed to the tip end of the inner wire by crimping or other suitable fastening method. The outer casing is arranged to have at least one curved section along a path that joins the manually operated part and the moving part. As a result, the friction force is reduced and the inner wire can move more easily than in a case where the entire inner wire is covered with an outer casing. The outer casing is secured by an outer anchoring part provided on the manually operated part or cable-operated part and a cap holder fastened to the frame. In this kind of bicycle cable system, corrosion sometimes occurs at the exposed portion of the inner wire as well as at unexposed portions of the inner wire as a result of liquid penetrating the gap between the outer casing an the inner wire. Mud, dirt, and other contaminants can also enter into the gap between the outer casing and inner wire. Such corrosion and contamination makes it more difficult for the inner wire to move with respect to the outer casing.

Bicycle cable systems are also known that are provided with an inner sheath that covers the inner wire in order to prevent such corrosion and contamination. For example, of a bicycle cable system is disclosed in U.S. Pat. No. 5,353,626 (FIGS. 4 and 5). In the bicycle cable system of this patent, the inner sheath is provided over substantially the entire length of the inner wire in order to prevent the inner wire from becoming difficult to move due to corrosion or intruding contaminants. The inner sheath of the conventional bicycle cable system has an internal diameter that is sufficiently large for the inner wire to move relative to the internal surface thereof and an external diameter that is sufficiently small for the inner sheath to be inserted through the inside of the outer casing. The inner wire protrudes beyond both ends of the inner sheath and each end of the inner wire is connected to either a manually operated part or a cable-operated part.

In the conventional bicycle cable systems with an inner sheath described above, the inner wire is less exposed than the inner wire of a bicycle cable system not having an inner sheath because the inner sheath covers the entire inner wire except for the connecting portions of the inner wire. Consequently, it is more difficult for the inner wire to become corroded or penetrated by contaminants and, thus, degradation of the ease of movement of the inner wire can be prevented to some degree.

In view of the above, it will be apparent to those skilled in the art from this disclosure that there exists a need for an improved bicycle cable. This invention addresses this need in the art as well as other needs, which will become apparent to those skilled in the art from this disclosure.

SUMMARY OF THE INVENTION

It has been discovered that since the bicycle cable system as described above is configured such that the inner wire and the inner sheath can move relative to each other, a gap is provided between the inner wire and the inner sheath in order to ensure that the inner wire moves smoothly. Meanwhile, the portions of the inner wire where the inner wire connects to the manually operated part and the cable-operated part are exposed. Consequently, the exposed portions are susceptible to corrosion and the intrusion of contaminants between the inner sheath and the inner wire and there is the possibility that the inner wire will become difficult to move due to corrosion caused by liquids adhering to the exposed portions and contaminants entering from the exposed portions.

One object of the present invention is to provide a bicycle cable that effectively suppresses the intrusion of contaminants between the inner wire and the inner sheath, and thereby, prevent the inner wire from degrading and becoming difficult to move.

The foregoing objects can basically be attained by providing a bicycle cable in accordance with a first aspect of the present invention, which basically includes an outer casing, an inner wire, an inner sheath and an inner sheath cap member. The outer casing has a hollow interior passage. The inner wire extends through the hollow interior passage of the outer casing. The inner sheath is configured and arranged to cover at least a portion of the inner wire that protrudes beyond the outer casing. The inner sheath cap member is mounted to an end part of the inner sheath with the inner wire extending through the cap member. The inner sheath cap member includes a cylindrical mounting section and a bottom section. The cylindrical mounting section is mounted on the outside circumference of an end part of the inner sheath. The bottom section is formed on one end of the mounting section and having a cable passage hole with the inner wire passing therethrough. Preferably, one of such an inner sheath cap member is mounted to each end of the inner sheath covering the inner wire. It is acceptable for the inner wire to be installed inside the inner sheath either before the cap members are mounted or after the cap members are mounted. Since each cap member comprises a mounting section arranged on an end of the inner sheath and a bottom section that is formed on one end of the mounting section and has a passage hole through which the inner wire can pass, the gap between the inner wire and the inner sheath can be blocked at both ends of the inner sheath by the bottom sections of the cap members when the cap members are mounted to both ends of the inner sheath. As a result, the intrusion of contaminants into the gap between the inner sheath and the inner wire can be suppressed and degradation of the inner wire and its ability to move smoothly can be prevented in an effective fashion.

In accordance with a second aspect of the present invention, the cable passage hole has an internal width that is smaller than an internal width of the inner sheath. With this cap member, since the cable passage hole through which the inner wire passes has a smaller internal diameter than the inner sheath, contaminants can be prevented more effectively from entering into the gap between the inner sheath and the inner wire.

In accordance with a third aspect of the present invention, the cable is configured such that the cable passage hole has an internal width that is larger than an external width of the inner wire. With this cap member, contaminants can be prevented from entering into the gap between the inner sheath and the inner wire and the sliding friction resulting from the contact between the inner wire and the cable passage hole can be held to a low level, thereby making it easier for the inner wire to move.

In accordance with a fourth aspect of the present invention, the cable is configured such that the cable passage hole has an internal width that is substantially equal to the external width of the inner wire. With this cap member, contaminants can be prevented from entering into the gap between the inner sheath and the inner wire even more reliably without the sliding friction between the inner wire and the cable passage hole becoming excessively large.

In accordance with a fifth aspect of the present invention, the cable is configured such that the cable passage hole has an internal width that is smaller than an external diameter of the inner wire. With this cap member, an excellent seal structure is obtained around the entire circumference of the cable passage hole and contaminants can be almost completely prevented from entering into the gap between the inner sheath and the inner wire.

In accordance with a sixth aspect of the present invention, the cable is configured such that the inner sheath cap member includes a seal member housing section arranged between the bottom section and the end part of the inner sheath. With this cap member, an elastic seal, a lubricant, or other additional seal member can be arranged in the cap member, enabling the gap between the inner sheath and the inner wire to be sealed even more reliably.

In accordance with a seventh aspect of the present invention, the cable is configured such that the seal member housing section includes a lubricant enclosed inside the seal member housing section. With this cap member, a grease or other lubricant serving as a seal member is enclosed inside the seal member housing section and enables the gap to be sealed without inhibiting the movement of the inner wire.

In accordance with an eighth aspect of the present invention, the cable is configured such that the seal member housing section has an elastic seal member installed inside the seal member housing section. With this cap member, an O-ring or other elastic seal member is installed in the seal member housing section and enables the gap to be sealed in a reliable fashion. Also, by applying grease or another lubricant to the elastic seal member, the gap can be reliably sealed without inhibiting the movement of the inner wire.

In accordance with a ninth aspect of the present invention, the cable is configured such that the bottom section of the inner sheath cap member contacts the end part of the inner sheath. With this cap member, the cap member can be manufactured inexpensively because the structure of the cap member can be simplified.

In accordance with a tenth aspect of the present invention, the cable is configured such that the cable passage hole has an annular ridge section provided on an internal circumference of the cable passage hole. With this cap member, the sliding friction between the inner wire and the cable passage hole can be suppressed by forming annular ridges in the passage hole using, for example, a screw tapping method and allowing the ridges to contact the outside surface of the inner wire.

In accordance with an eleventh aspect of the present invention, the cable is configured such that the annular ridge section has an innermost width that is smaller than an external width of the inner wire. With this cap member, the sealing performance can be improved because reliable contact is established between the annular ridge section and the outside surface of the inner wire.

In accordance with a twelfth aspect of the present invention, the cable is configured such that the inner sheath cap member further includes a generally cylindrical nose section extending from an outside face of the bottom section that lies radially to the outside of the cable passage hole such that the inner wire passing therethrough. With this cap member, a high sealing performance can be maintained easily without using grease or another lubricant because the inner wire is covered by the cylindrical nose section.

In accordance with a thirteenth aspect of the present invention, the cable is configured such that the nose section contacts the inner wire. With this cap member, an even higher seal performance can be maintained.

In accordance with a fourteenth aspect of the present invention, the cable is configured such that the nose section is configured and arranged such that a gap exists between the nose section and the inner wire. With this cap member, the sealing performance can be maintained while also suppressing the sliding friction because an appropriate gap is provided. Additionally, the sealing performance can be maintained to an even greater degree while also suppressing the sliding friction by enclosing grease or another lubricant between the nose section and the inner wire.

In accordance with a fifteenth aspect of the present invention, the cable is configured such that the nose section has a labyrinth seal section provided on an internal surface of the nose section. With this cap member, as a result of providing a labyrinth seal on the internal surface of the nozzle section, the sliding friction can be suppressed while maintaining a high sealing performance.

In accordance with a sixteenth aspect of the present invention, the cable is configured such that the outer casing includes at least one curved section along a path joining a manually operated part and a cable-operated part together, and the inner sheath is arranged in at least one straight section along the path. With this bicycle cable, the efficiency with which the cable moves when the brake device or gear changing device to which it is connected is operated will not be markedly reduced by the existence of the outer casing arranged in the curved sections of the cable. Furthermore, since the outer casing is arranged only in the curved sections of the cable system and not in the straight sections, a comparatively lightweight bicycle cable system can be provided.

In accordance with a seventeenth aspect of the present invention, the cable is further provided with an additional inner sheath cap member arranged on one end of the inner sheath. With this bicycle cable, the intrusion of contaminants into the gap between the inner sheath and the inner wire can be suppressed by the inner sheaths arranged in the straight sections where the outer casings are not arranged (i.e., the sections other than the curved sections) and the cap members arranged on both ends of the inner sheath, thereby making it possible to provide a bicycle cable capable of preventing degradation of the inner wire in an effective fashion.

In accordance with an eighteenth aspect of the present invention, the cable is configured such the inner sheath is configured and arranged with a gap formed between the outer casing and the inner wire. With this bicycle cable, a single inner sheath can be arranged to cover substantially the entire length of the inner wire by inserting the inner sheath through the outer casing and the intrusion of contaminants can be prevented even more reliably.

In accordance with a nineteenth aspect of the present invention, the cable is configured such the outer casing includes at least one curved section along a path joining a manually operated part and a cable-operated part together, and the inner sheath is arranged to pass through the outer casing and run along substantially the entire length the path. With this bicycle cable, the efficiency with which the cable moves when the brake device or gear changing device to which it is connected is operated will not be markedly reduced by the existence of the outer casing arranged in the curved sections of the cable system. Additionally, a bicycle cable having a superior dust-proof structure can be provided because the inner sheath covers substantially the entire length of the inner wire and the cap members are arranged on both ends of the inner sheath. Furthermore, since the outer casing is arranged only in the curved sections of the cable system and not in the straight sections, a comparatively lightweight bicycle cable can be provided.

In accordance with a twentieth aspect of the present invention, the cable is further provided with an additional inner sheath cap member arranged on one end of the inner sheath. With this bicycle cable, the intrusion of contaminants into the gap between the inner sheath and the inner wire can be suppressed by the inner sheaths arranged in the straight sections where the outer casings are not arranged (i.e., the sections other than the curved sections) and the cap members arranged on both ends of the inner sheath, thereby making it possible to provide a bicycle cable capable of preventing degradation of the inner wire in an effective fashion.

Since a bicycle cable in accordance with the present invention comprises a mounting section arranged on an end of the inner sheath and a bottom section that is formed on one end of the mounting section and has a passage hole through which the inner wire can pass, the gap between the inner wire and the inner sheath can be blocked at both ends of the inner sheath by the bottom sections of the cap members when a cap member is mounted to each of both ends of the inner sheath. As a result, the intrusion of contaminants into the gap between the inner sheath and the inner wire can be suppressed and degradation of the inner wire and its ability to move smoothly can be prevented in an effective fashion.

Also, in a bicycle cable in accordance with the present invention, since the portions of the inner wire that protrude beyond the outer casing are covered by the inner sheath and cap members are mounted to both end parts of the inner sheath, the gap between the inner wire and the inner sheath can be blocked at both ends of the inner sheath by the bottom sections of the cap members. As a result, the intrusion of contaminants into the gap between the inner sheath and the inner wire can be suppressed and degradation of the inner wire and its ability to move smoothly can be prevented in an effective fashion.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
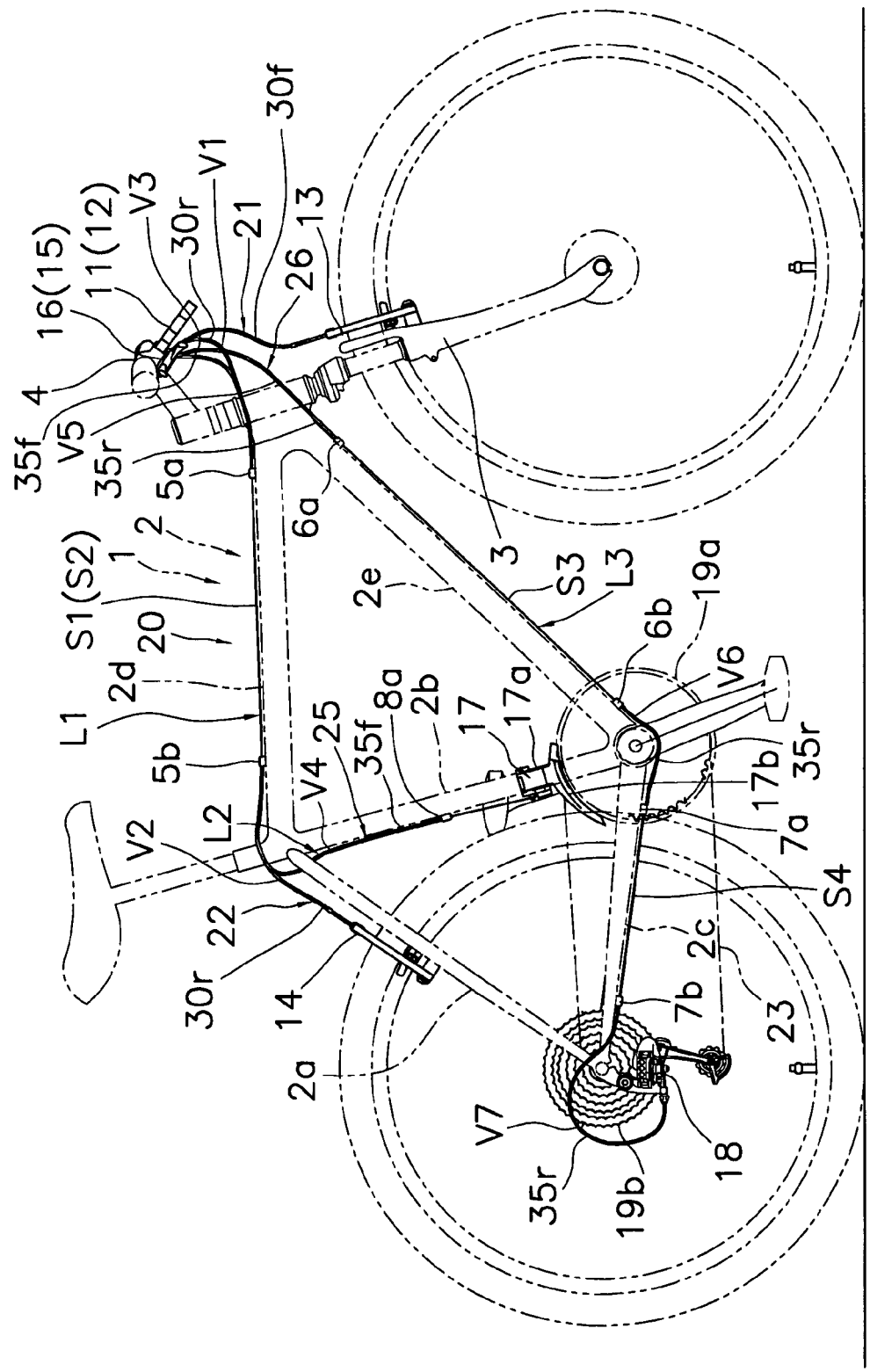
FIG. 1 is a diagrammatic side elevational view of a bicycle equipped with several bicycle cable systems in accordance with an embodiment of the present invention.

Referring initially to FIG. 1, a bicycle 1 is illustrated that is equipped in accordance with a first embodiment of the present invention, as explained below. The bicycle 1 includes a frame 2 with a suspension fork 3 and a handlebar 4 mounted on the suspension fork 3. The frame 2 has a front triangle and a rear triangle disposed behind the front triangle. The frame 2 is basically formed by a pair of seat stays 2a, a seat tube 2b, a pair of chain stays 2c, a top tube 2d, and a down tube 2e. The frame 2 is further provided with a pair of outer anchoring parts 5a and 5b on the top tube 2d, a pair of outer anchoring parts 6a and 6b on the down tube 2e, a pair of outer anchoring parts 7a and 7b on the right side one of the chain stays 2c, and a pair of outer anchoring parts 8a and 8b on the seat tube 2b.

The handlebar 4 has a grip 9 mounted at each of the free ends of the handlebar 4. A front brake lever 11 is mounted to the inside of the grip 9 mounted on the right end of the handlebar 4, while a rear brake lever 12 is mounted to the inside of the grip 9 mounted on the left end of the handlebar 4. Also, the handlebar 4 has a front gear shift device 15 mounted at one side and a rear gear shift device 16 mounted on the opposite side. The front and rear gear shift devices 15 and 16 are examples of manually operated devices or components. The front gear shift device 15 is operatively coupled to a front derailleur 17, while the rear gear shift device 16 is operatively coupled to derailleur 18. The front and rear derailleurs 17 and 18 are examples of cable-operated devices or components.

As best shown in FIG. 1, a bicycle cable system 20 includes a pair (front and rear) of brake cables 21 and 22 and a pair (front and rear) of gear shift cables 25 and 26. The front and rear brake cables 21 and 22 are connected between the front and rear brake levers 11 and 12 and the front and rear brake devices 21 and 22, respectively. The front and rear gear shift cables 25 and 26 are connected between the front and rear gear shift devices 15 and 16 and the front and rear derailleurs 17 and 18, respectively.

Figure 2:
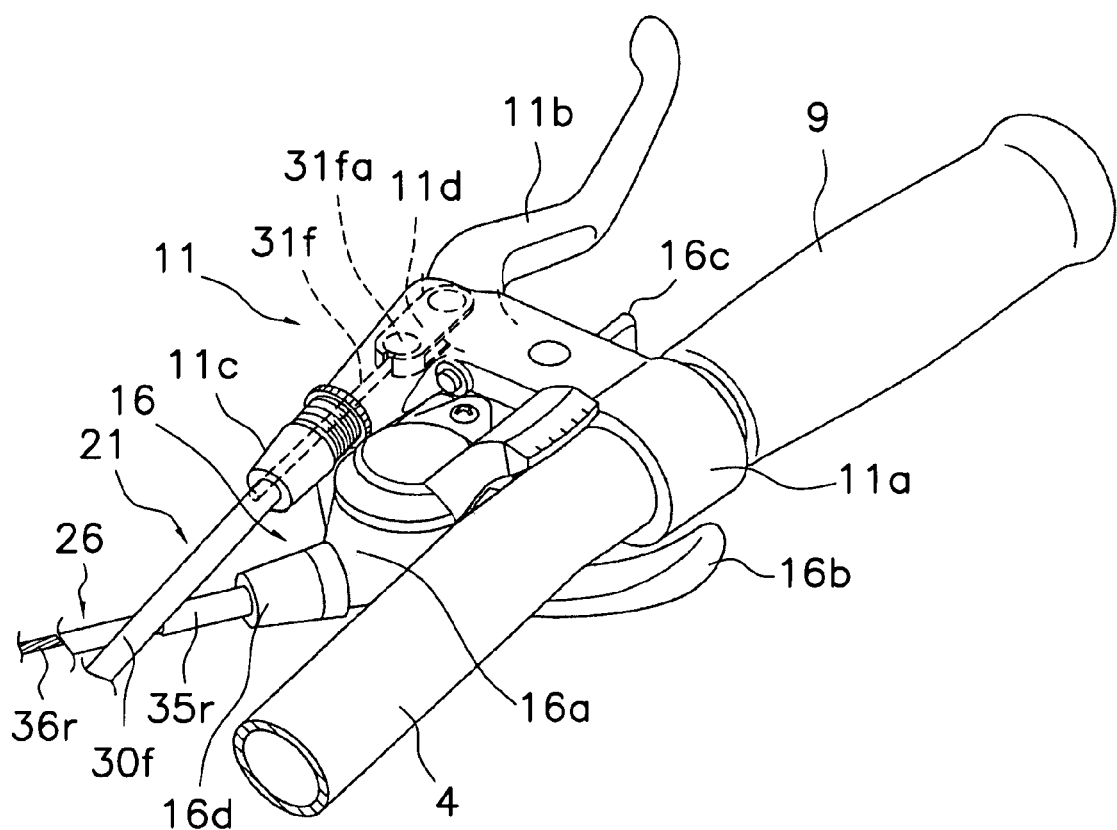
FIG. 2 is a perspective view of a front brake lever and surrounding components that uses a bicycle cable system in accordance with the present invention.
Figure 5:
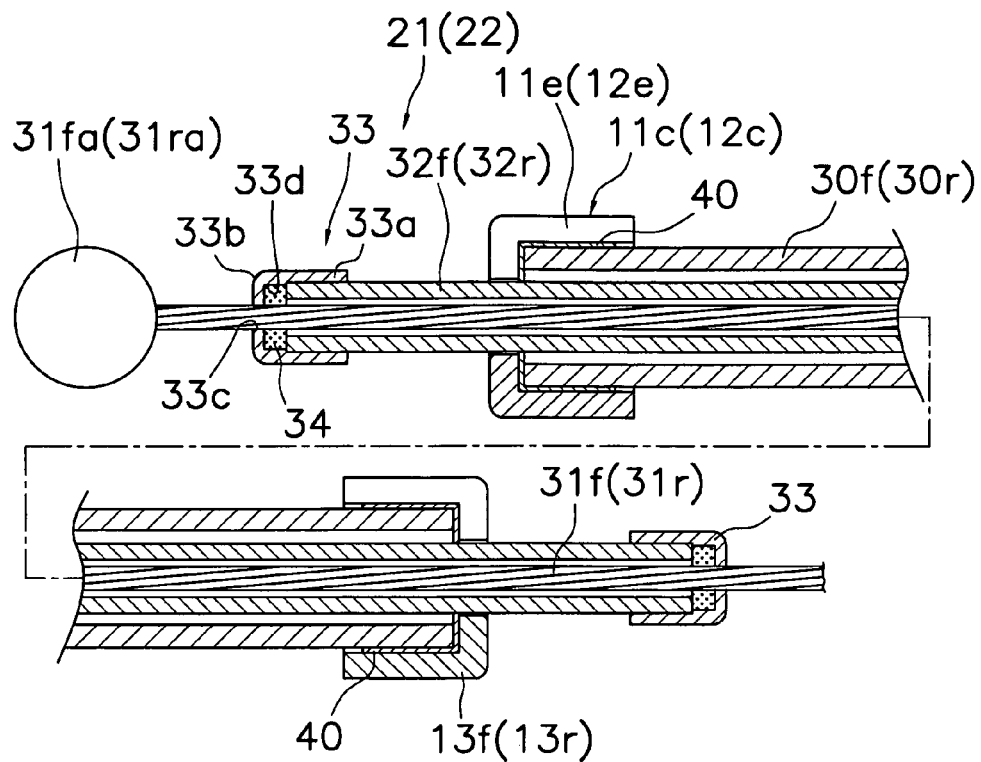
FIG. 5 is a partial cross sectional view of one of the brake cables in accordance with the present invention.

As shown in FIG. 2, the front brake lever 11 is mounted to the inside of a grip 9 mounted on the right end of the handlebar 4. The front brake lever 11 has a brake bracket 11a and a lever body 1 lb. The brake bracket 11a is mounted to the handlebar 4. The lever body 11b is mounted in a freely pivotal manner to the brake bracket 11a. The brake bracket 11a is provided with an outer anchoring part 11c for securing the outer casing 30f of the front brake cable 21. The lever body 11b is provided with an inner anchoring part 11d for securing a cable nipple 31fa that is fixed to the tip end of the inner wire 31f of the front brake cable 21. As shown in FIG. 5, the outer anchoring part 11c is provided with a cable passage groove 11e configured to enable the inner wire 31f and an inner sheath 32f (discussed later) installed over the inner wire 31f to be inserted therein or removed therefrom from one side thereof.

The rear brake lever 12 is constructed similarly as a mirror image of the front brake lever 11 and has a brake bracket, a lever body, an outer anchoring part 12c (FIG. 5), and an inner anchoring part.

Figure 3:
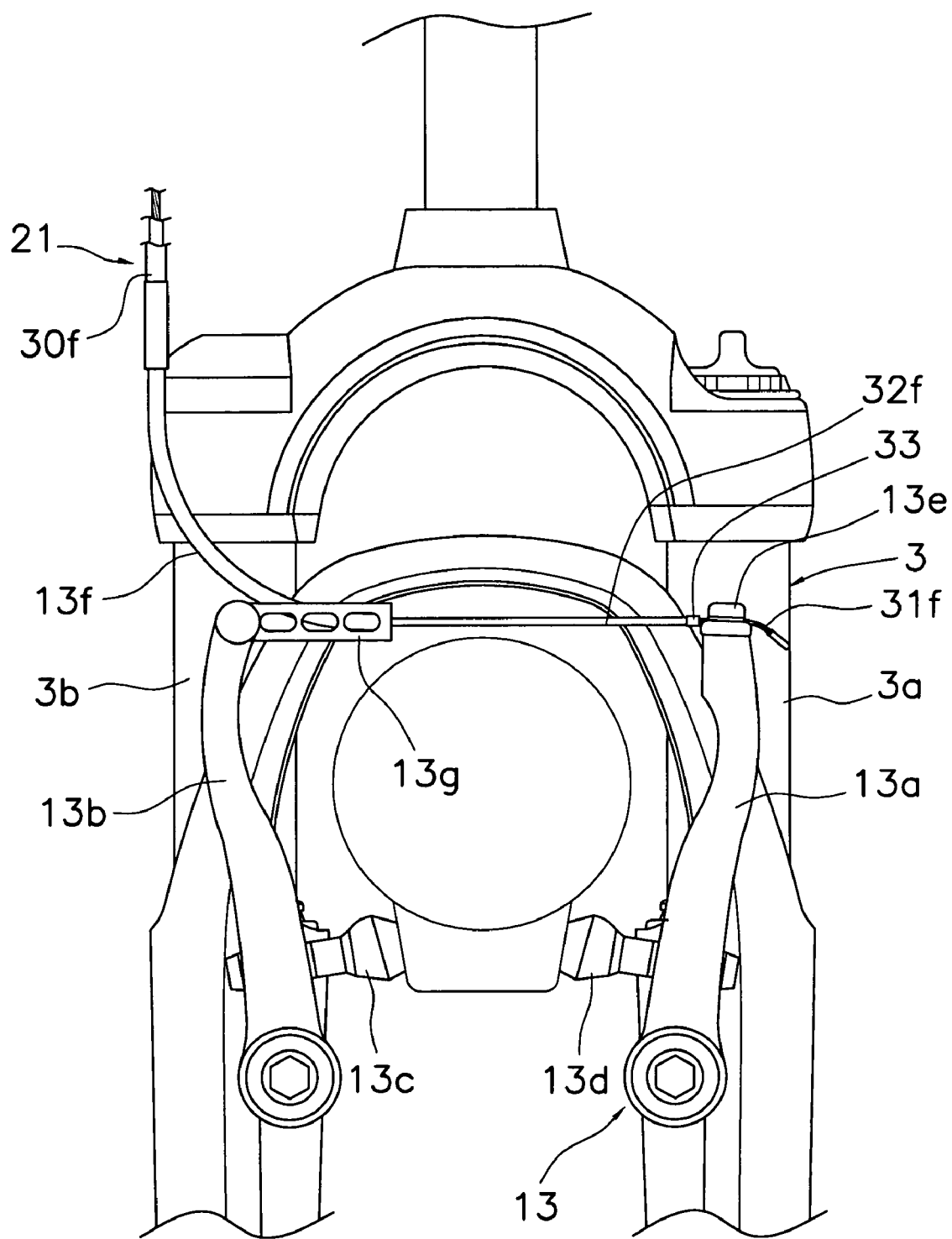
FIG. 3 is a front elevational view of a front brake device mounted to a suspension fork that uses a bicycle cable system in accordance with the present invention.

The front brake device 13 is arranged in an intermediate position on the suspension fork 3. The rear brake device 14 is arranged in an intermediate position on the seat stays 2a of the frame 2. As shown in FIG. 3, the front brake device 13 comprises a pair (left and right) of brake arms 13a and 13b and brake shoes 13c and 13d fastened to the brake arms 13a and 13b. Each of the brake arms 13a and 13b is mounted in a freely pivotal manner at a base end thereof to the left and right cylinder parts 3a and 3b, respectively, of the suspension fork 3. The brake shoes 13c and 13d are fastened to the brake arms 13a and 13b at positions near the fulcra of the brake arms 13a and 13b. An inner anchor part 13e configured to anchor the end of the inner wire 31f of the front brake cable 21 with a screw is provided on the free end of the left brake arm 13a. An outer anchoring part 13f for securing the outer casing 30f of the front brake cable 21 is provided on the free end of the right brake arm 13b. The outer anchoring part 13f is a curved pipe-like member configured to latch onto a link member 13g mounted in a freely pivotal manner to the right brake arm 13b. The rear brake device 14 has the same constituent features as the front brake device 13.

The front and rear gear shift devices 15 and 16 are arranged on the handlebar 4 closely adjacent to the brake levers 12, and 11. As shown in FIG. 2, the rear gear shift device 16 includes a main unit 16a, a winding lever 16b, and a releasing lever 16c. The main unit 16a is fastened to the brake bracket 11a of the front brake lever 11. The winding lever 16b is mounted in a freely pivotal fashion to the main unit 16a. The releasing lever 16c is mounted in a freely pivotal fashion to the main unit 16a. The rear gear shift device 16 also includes a winding body (not shown) that is provided inside the main unit 16a and configured such that the inner wire 35r of the rear gear shift cable 26 can be anchored thereto. The winding body can be set to any of, for example, nine rotary positions. The main unit 16a is provided with an outer anchoring part 16d for securing the outer casing 35r of the rear gear shift cable 26. When the winding lever 16b is operated through a prescribed stroke distance, the winding body rotates in the winding direction one step at a time, thereby winding in the inner wire 36r and upshifting the rear derailleur 18. Conversely, when the releasing lever 16c is operated, the winding body rotates in the opposite direction one step at a time, thereby downshifting the rear derailleur 18.

The front gear shift device 15 is provided on the rear brake lever 12 and is constructed similarly as a mirror image of the rear gear shift device 16. The front gear shift device 15 has a main unit, a winding lever, a releasing lever, a winding body, an outer anchoring part 15d (FIG. 6) and an inner anchoring part. The winding body can be set to any of three positions instead of nine rotary positions.

The front derailleur 17 is arranged on, for example, a lower portion of the seat tube 2b of the frame 2 and serves to guide the chain 23 to any sprocket (chainwheel) of a front gear cluster 19a having, for example, three sprockets. The front derailleur 17 has a base member 17a and a chain guide 17b. The base member 17a is configured to be fastened to the seat tube 2b, while the chain guide 17b is connected to the base member 17a through a four-point link mechanism (not shown). An inner anchoring part (not shown) for securing the inner wire 36f (FIG. 6) of the front gear shift cable 25 is provided on the four-point mechanism.

Figure 4:
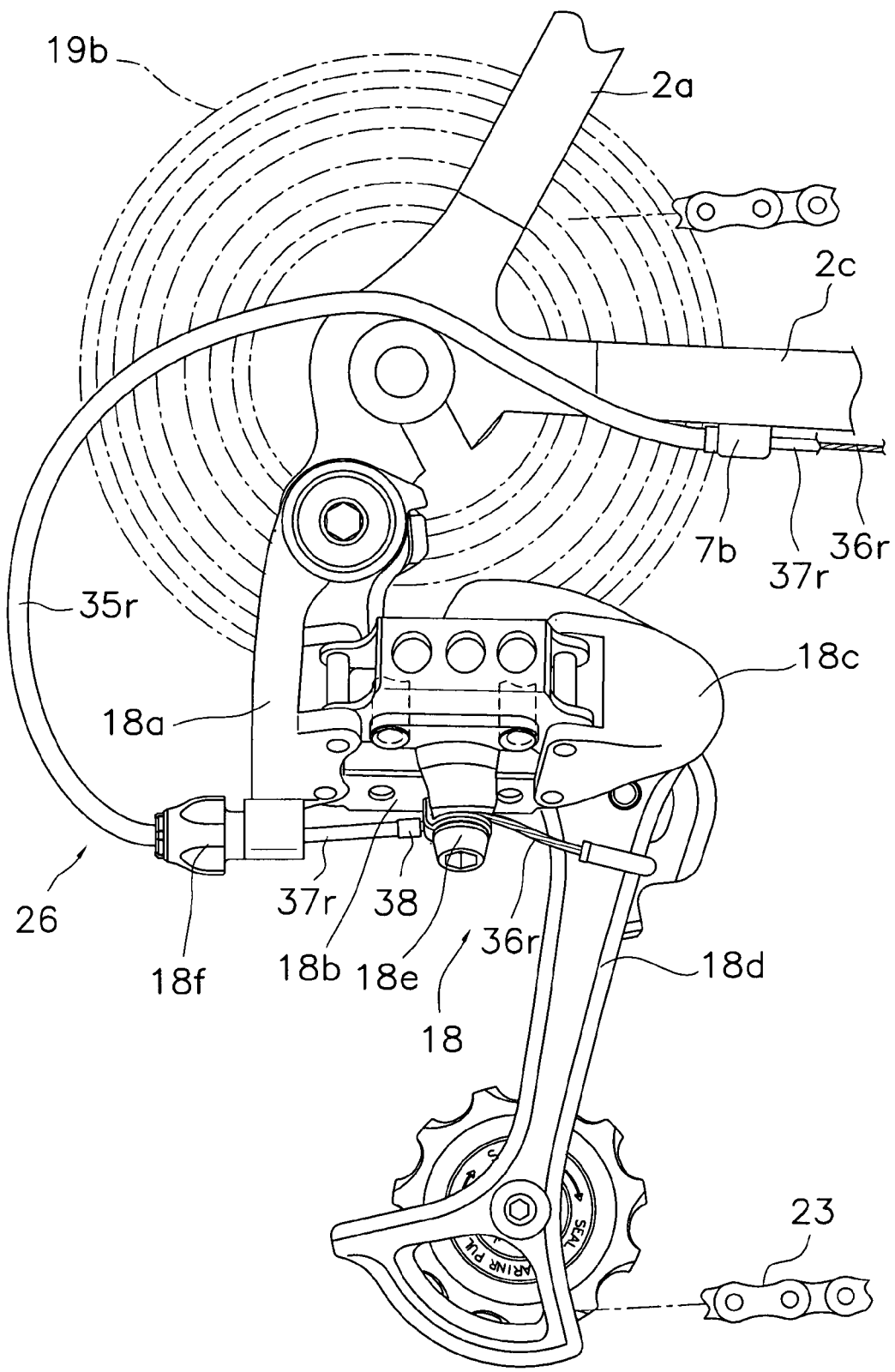
FIG. 4 is a side elevational view of a rear derailleur mounted on a rearward end portion of the frame that uses a bicycle cable system in accordance with the present invention.

The rear derailleur 18 is arranged on, for example, a rearward end portion of the seat stays 2c of the frame 2 and serves to guide the chain 23 to any sprocket (chainwheel) of a rear gear cluster 19b having, for example, nine sprockets. As shown in FIG. 4, the rear derailleur 18 has a base member 18a, a four-point link mechanism 18b, a moveable member 18c, and a chain guide 18d. The base member 18a is configured to be fastened to the chain stays 2c. The four-point link mechanism 18b is connected at one end to the base member 18a and at the other end to the moveable member 18c. The chain guide 18d is mounted in a freely pivotal manner to the moveable member 18c. The four-point link mechanism 18b is spring loaded in such a direction as to cause the chain guide 18d to move away from the frame 2 and the chain guide 18d is spring loaded rotationally in the clockwise direction from the perspective of FIG. 4. The four-point link mechanism 18c is provided with an inner anchor mechanism 18e for securing the inner wire 36r of the rear gear shift cable 26. Meanwhile, the base member 18a is provided with an outer anchor mechanism 18f for securing the outer casing 35r of the rear gear shift cable 26.

As shown in FIG. 1, the front brake cable 21 is connected directly between the front brake lever 11 and the front brake device 13 and forms only a curved section between the same (i.e., it has no straight sections). As shown in FIG. 5, the front brake cable 21 includes an outer casing 30f, an inner wire 31f, an inner sheath 32f and a pair of cap members 33. The inner wire 31f is configured such that it can pass through the outer casing 30f. The inner sheath 32f is arranged so as to cover substantially the entire length of the inner wire 31f, excluding an anchor portion. The cap members 33 are mounted on both ends of the inner sheath 32.

The outer casing 30f has a synthetic resin liner (not shown) arranged so as to have a gap with respect to the outside surface of the inner sheath 32f, a flat steel wire wound helically onto the outside circumference of the liner, and a synthetic resin jacket that covers the outside circumference of the flat steel wire. An outer cap 40 shaped like a cylinder with a bottom is mounted to each of the outer anchoring parts 11c and 13f of the outer casing 30f. As shown in FIG. 5, the outer anchoring part 11c is provided with a cable passage groove 11e configured to enable the inner wire 31f and the inner sheath 32f to be inserted therein or removed therefrom from one side thereof.

The inner wire 31f is made of intertwined steel wire and has on one end thereof a thick-circular-disk-shaped cable nipple 31fa for latching onto the inner anchoring part 11d of the front brake lever 11, the cable nipple 31fa being fixed to the tip end of the inner wire 31f by crimping or other suitable fastening method.

The inner sheath is preferably a tubular member made of 4-ethylene fluoride, polypropylene, or other synthetic resin having excellent sliding performance. However, the material from which the inner sheath 32f is made is not limited to the materials mentioned here. The inner sheath 32f is configured such that it can be arranged in the gap between the outer casing 30f and the inner wire 31f and can be inserted through the outer casing 30f.

Figure 7:
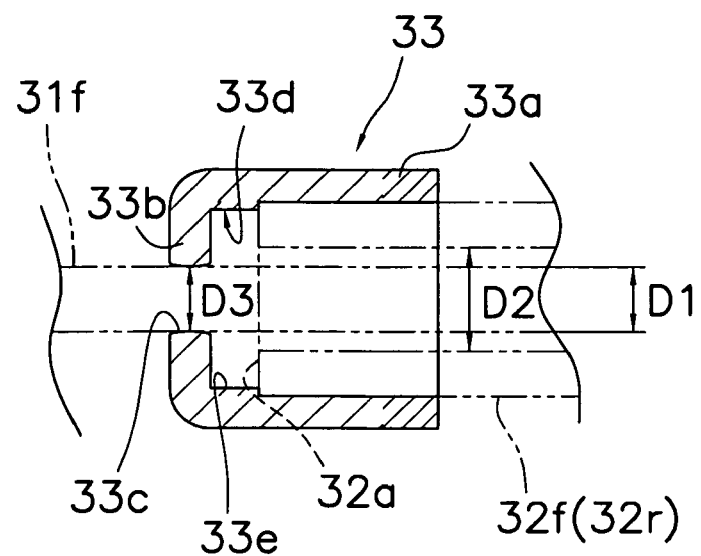
FIG. 7 is a cross sectional view of the cap member of one of the brake cables in accordance with the present invention.

The cap members 33 are preferably shaped like a cylinder having a bottom and made of an elastic synthetic resin having a comparatively high flexibility, such as urethane rubber or silicon rubber. However, the material from which the cap member is made is not limited to the materials mentioned here. As shown in FIGS. 5 and 7, each of the cap members 33 has a cylindrical mounting section 33a, a circular disk-shaped bottom section 33b, a cable passage hole 33c and a seal member housing section 33d. The mounting section 33a is configured to be mounted to the outside circumference of the inner sheath 32f. The circular disk-shaped bottom section 33b is formed on one end of the mounting section 33a. The cable passage hole 33c is configured such that the inner wire 31f can pass therethrough. The seal member housing section 33d is arranged in a position between the bottom section 33b and the end part 32a of the inner sheath 32f. The seal member housing section 33d is configured such that a seal member can be arranged therein. It is also acceptable for the mounting section 33a to have an outside diameter that can pass through the inside of the outer casing 30f. If the outside diameter of the mounting section 33a is such that it can fit into the outer casing 30f, then the inner sheath 32f and the inner wire 31d can be inserted into and removed from the outer casing 30f even with the cap member 33 attached to the inner sheath 32f.

The seal member housing section 33d comprises a small diameter section 33e where the internal diameter of the mounting section 33a is smaller than the external diameter of the inner sheath 32f. In this embodiment, grease 34 (which is a lubricant) is enclosed inside the seal member housing section 33d as a seal member. Also, the internal diameter D3 of the cable passage hole 33c is smaller than the internal diameter D2 of the inner sheath 32f and the internal diameter D3 of the cable passage hole 33c is larger than the external diameter of the inner wire 31f. Thus, since the cable passage hole 33c through which the inner wire 31f passes has a smaller internal diameter than the inner sheath 32f, contaminants can be prevented more effectively from entering into the gap between the inner sheath 32f and the inner wire 31f.

Furthermore, since the internal diameter D3 of the cable passage hole 33c is larger than the external diameter D1 of the inner wire 31f, the amount of contact between the inner wire 31f and the cable passage hole 33c is small and there is little resistance to sliding of the inner wire 31f. Consequently, it is easier for the inner wire 31f to move.

It is also acceptable to make the internal diameter D3 of the cable passage hole 33c either equal to or smaller than the external diameter D1 of the inner wire 31f. If the internal diameter D3 of the cable passage hole 33c is equal to the external diameter D1 of the inner wire 31f, contaminants can be prevented from entering into the gap between the inner sheath 32f and the inner wire 31f even more reliably without the sliding friction between the inner wire 31f and the cable passage hole 33c becoming excessively large. If the internal diameter D3 of the cable passage hole 33c is smaller than the external diameter D1 of the inner wire 31f, an excellent seal structure is obtained around the entire circumference of the cable passage hole 33c and contaminants can be almost completely prevented from entering into the gap between the inner sheath 32f and the inner wire 31f. As shown in FIGS. 2 and 3, the front brake cable 21 is configured such that the cap members 33 are arranged near the inner anchoring parts 11d and 13e of the front brake lever 11 and the front brake device 13, respectively.

As shown in FIG. 1, the rear brake cable 22 is arranged between the rear brake lever 12 and the rear brake device 14 and connects the same through a path that follows along the frame 2. The rear brake cable 22 is arranged along the top tube 2d of the frame 2. The two outer anchoring parts 5a and 5b are arranged on the top tube 2d with a space therebetween and fastened to the top tube 2d by welding or other suitable fastening method. Outer anchoring parts for the front gear shift cable 25 are also provided on the top tube 2d together with the outer anchoring parts 5a and 5b for the-rear brake cable 22. Thus, the two cables 22 and 25 are arranged generally parallel to each other on the top tube 2d.

The rear brake cable 22 includes a pair of outer casings 30r, an inner wire 31r, an inner sheath 32r, and a pair of cap members 33. The two outer casings 30r are arranged in two curved sections V1 and V2 along the connecting path L1 through which the rear brake cable 22 joins the rear brake lever 12 and the rear brake device 14. The inner wire 31r is arranged along the connecting path L1. The inner sheath 32r is arranged along substantially the entire length of the inner wire 31r. The cap members 33 are mounted on both ends of the inner sheath 32r. The constituent features of the rear brake cable 22 are the same as those of the front brake cable 21. Thus, a detailed description of the rear brake cable 22 is omitted for the sake of brevity.

The two curved sections V1 and V2 of the rear brake cable 22 are formed between the outer anchoring part 5a of the frame 2 and the outer anchoring part 12c of the rear brake lever 12 and between the outer anchoring part 5b of the frame 2 and the outer anchoring part 13f of the rear brake device 14. A straight section S2 is formed between the two curved sections V1 and V2, i.e., between the two outer anchoring parts 5a and 5b. In the straight section S1, the inner wire 31r of the rear brake cable 22 is covered only by the inner sheath 32r. Although not shown in the figures, the cap members 33 of the rear brake cable 22 are arranged near the inner anchoring parts of the rear brake lever 12 and the rear brake device 14, respectively, in the same manner as the cap members 33 of the front brake cable 21.

As shown in FIG. 1, the front gear shift cable 25 is arranged alongside the rear brake cable 22 on the top tube 22d and branches away from the rear brake cable 22 to follow along the seat tube 2b. The front gear shift cable 25 includes a pair of outer casings 35f (shown in FIG. 6), an inner wire 36f, an inner sheath 37f arranged along substantially the entire length of the inner wire 36f, and a pair of cap members 38. The two outer casings 35f are arranged in two curved sections V3 and V4 along the connecting path L2 through which the front gear shift cable 25 joins the front gear shift device 15 and the front derailleur 17. The inner wire 36f is arranged along the connecting path L2. The inner sheath 37f is arranged along substantially the entire length of the inner wire 36f. The cap members 38 are mounted on both ends of the inner sheath 37f. An outer anchoring part 8a is fixed at an intermediate position of the seat tube 2b. The structure of the front gear shift cable 25 is the same as that of the front brake cable 21, except that the shape of the cable nipple 36fa is rod-shaped. Thus, a detailed description of the front brake cable 21 is omitted for the sake of brevity.

Figure 6:
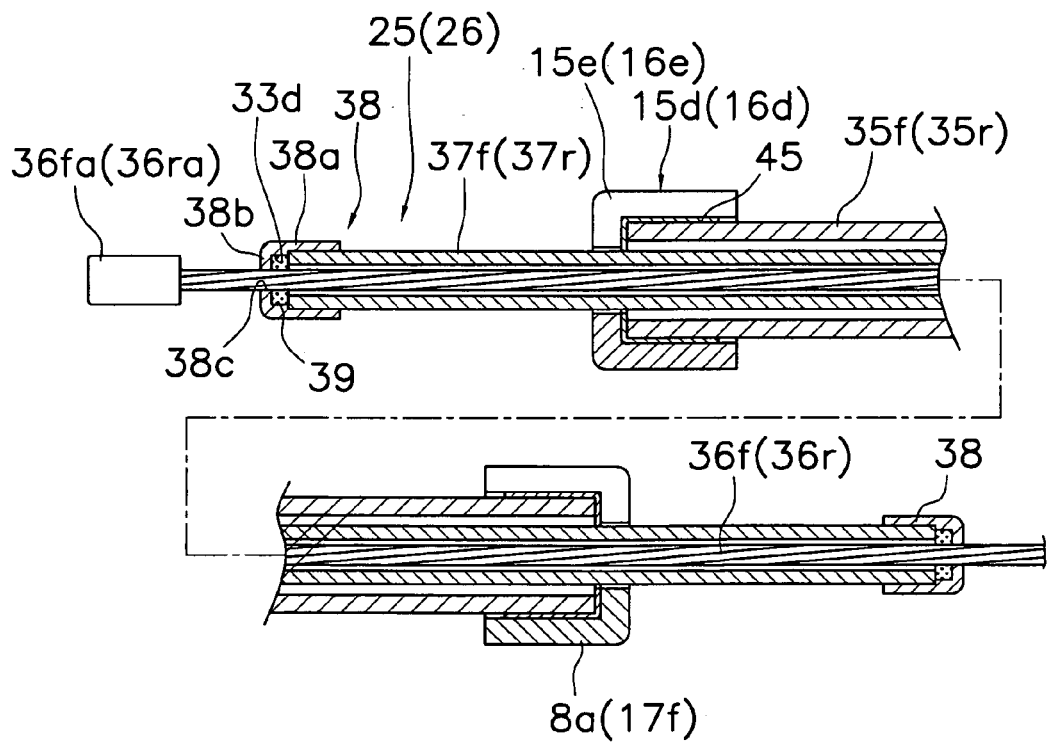
FIG. 6 is a partial cross sectional view of one of the gear shift cable in accordance with the present invention.

An outer cap 45 shaped like a cylinder with a bottom is mounted to the portion of the outer casing 35r that is anchored to the outer anchoring part 15d. As shown in FIG. 6, the outer anchoring part 15c is provided with a cable passage groove 15e configured to enable the inner wire 36f and the inner sheath 37f to be inserted therein or removed therefrom from one side thereof. Otherwise, parts shown in FIG. 6 that are the same as those shown in FIG. 5 are indicated with reference numerals obtained by adding 5 to the reference numerals of the corresponding parts of FIG. 5 and descriptions thereof are omitted for the sake of brevity.

The two curved sections V3 and V4 of the front gear shift cable 25 are formed between the outer anchoring part 5a of the frame 2 and the outer anchoring part 15d of the front gear shift device 15 and between the outer anchoring part 5b and the outer anchoring part 8a of the frame 2. A straight section S2 is formed between the two curved sections V3 and V4, i.e., between the two outer anchoring parts 5a and 5b. In the straight section S2, the inner wire 36f of the front gear shift cable 25 is covered only by the inner sheath 37f. Although not shown in the figures, the cap members 38 of the front gear shift cable 25 are arranged near the inner anchoring parts of the front gear shift device 15 and the front derailleur 17, respectively, in the same manner as the cap members 33 of the brake cables 21 and 22.

As shown in FIG. 1, the rear gear shift cable 26 runs along the down tube 2e and a chain stay 2c to reach the rear derailleur 18. The rear gear shift cable 26 includes three outer casings 35r (shown in FIG. 6), an inner wire 36r, an inner sheath 37r, and a pair of cap members 38. The three outer casings 35r are arranged in three curved sections V5 to V7 along the connecting path L3 through which the rear gear shift cable 26 joins the rear gear shift device 16 and the rear derailleur 18. The inner wire 36r is arranged along the connecting path L3. The inner sheath 37r is arranged along substantially the entire length of the inner wire 36r. The cap members 38 are mounted on both ends of the inner sheath 37r. The outer anchoring parts 6a and 6b are fastened to the ends of the down tube 2e, while the outer anchoring parts 7a and 7b are fastened to the ends of the chain stay 2c. The structural features of the rear gear shift cable 26 are the same as those of the front gear shift cable 25 and descriptions thereof are omitted for the sake of brevity.

The three curved sections V5 to V7 of the rear gear shift cable 26 are formed between the outer anchoring part 6a of the frame 2 and the outer anchoring part 16d of the rear gear shift device 16, between the outer anchoring part 6b and the outer anchoring part 7a of the frame 2, and between the outer anchoring part 7b of the frame 2 and the outer anchoring part 18f of the rear derailleur 18. Straight sections S3 and S4 are formed between the three curved sections V5 to V7, i.e., between the outer anchoring parts 6a and 6b and between the outer anchoring parts 7a and 7b. In the straight sections S3 and S4, the inner wire 36r of the rear gear shift cable 26 is covered only by the inner sheath 37r. As shown in FIG. 4, the cap members 38 of the rear gear shift cable 26 are arranged near the inner anchoring parts of the rear gear shift device 16 and the rear derailleur 18, respectively, in the same manner as the cap members 33 of the brake cables 21 and 22.

Each of the outer anchoring parts 5a, 5b, 6a, 6b, 7a, 7b and 8a fastened to the frame 2 is provided with a cable passage groove (not shown) configured to enable the inner wire and the inner sheath (which is installed over the inner wire) to be inserted therein or removed therefrom from one side thereof.

The installation of such a bicycle cable system 20 onto a bicycle 1 will now be explained using the installation of a gear shift cable between the rear gear shift device 16 and the rear derailleur 18 as an example.

Unlike the brake levers 11 and 12 that do not have the inner wires 31f and 31r, respectively, mounted in advance, the rear gear shift device 16 normally has the inner wire 36r and the inner sheath 37r already installed inside the rear gear shift device 16 and the cap members 38 are already mounted to both ends of the inner sheath 37r. Thus, the first task is to cut the three outer casings 35r that will be arranged in the curved sections V5 to V7 into appropriate lengths. The inner wire 36r with the inner sheath 37r and the cap members 33 attached thereto is passed through the inside of the three outer casings 35r. The three outer casings 36r are then secured in the outer anchor parts 11c, 6a, 6b, 7a, 7b and 18f. When securing the outer casings 36r in the outer anchoring parts that are fastened to the frame 2, the inner sheath 37r is inserted into each anchoring part from the side using the cable passage groove before securing the outer casings 36r in place. Of course, the outer casing 36r can be installed in the same fashion into the outer anchoring part 18f of the rear derailleur 18 if a cable passage groove is provided. If a cable passage groove is not provided, the inner sheath 37r and the cap member 33 mounted thereon are passed straight through the outer anchoring part. The tip of the inner wire 36r is secured to the inner anchoring part 18e with a screw. At this point, the installer checks that inner wire 36r is in a tensioned state.

After all of the cables 21, 22, 25 and 26 have been installed, the installer checks the operation of the brakes and gear shifters and ends the cable installation process.

In a bicycle cable system 20 according to this embodiment, the brake cables 21 and 22 and the gear shift cables 25 and 26 each have an inner sheath 32f, 32r, 37f and 37r and the cap members 33 and 38 are mounted to both ends of each inner sheath 32f, 32r, 37f and 37r. The portions of each inner wire 31f, 31r, 36f and 36r that protrude beyond the outer casings 30f, 30r, 35f and 35r are covered by the inner sheaths 32f, 32r, 37f and 37r, and the bottom sections 33b and 38b of the cap members 33 and 38 mounted to the ends of the inner sheaths 32f, 32r, 37f and 37r serve to block the gaps that exist between inner wires 31f, 31r, 36f and 36r and the inner sheaths 32f, 32r, 37f and 37r at both ends of each inner sheath 32f, 32r, 37f and 37r. As a result, the intrusion of contaminants into the gaps between inner wires 31f, 31r, 36f and 36r and the inner sheaths 32f, 32r, 37f and 37r can be suppressed and the inner wire 31f can be effectively prevented from becoming difficult to move.

Other Embodiments

Figure 8:
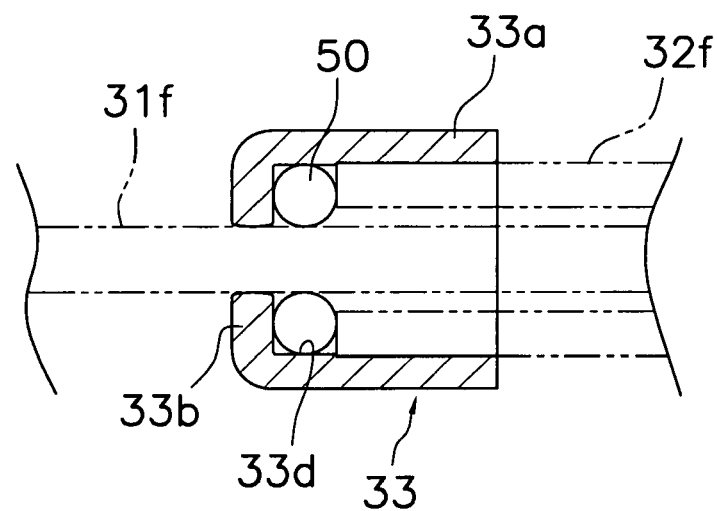
FIG. 8 is a cross sectional view, corresponding to FIG. 7, of a cap member of one of the cables in accordance with another embodiment.

Although in the previously described embodiments grease is enclosed in the seal member housing section 33d, it is also acceptable to install an elastic seal member 50, such as an O-ring, as shown in FIG. 8. In such a case, an O-ring made of fluorine rubber can maintain a high sliding performance. It is also acceptable to use a typical nitrile rubber O-ring and apply grease or other lubricant to the surface thereof to obtain a high sliding performance. When an O-ring or other elastic seal member 50 is installed in the seal member housing section 33d, the gap between the inner sheath and the inner wire can sealed in a reliable fashion. Also, by applying grease or another lubricant to the elastic seal member 50, the gap can be reliably sealed without inhibiting the movement of the inner wire 31f.

Figure 9:
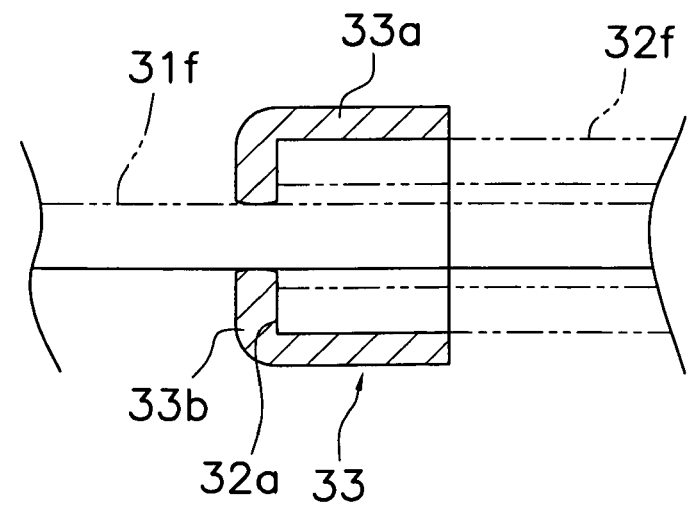
FIG. 9 is a cross sectional view, corresponding to FIG. 7, of a cap member of one of the cables in accordance with still another embodiment.

As shown in FIG. 9, it is also acceptable to configure the cap member 33 such that it does not have a seal member housing section 33d and arrange the cap member 33 such that the bottom section 33b contacts the end part 32a of the inner sheath 32f. With such a cap member 33, the cap member 33 can be manufactured inexpensively because the structure of the cap member 33 can be simplified.

Figure 10:
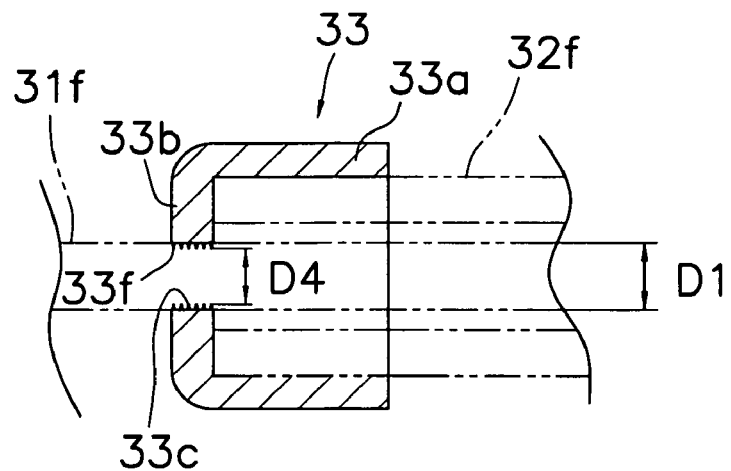
FIG. 10 is a cross sectional view, corresponding to FIG. 7, of a cap member of one of the cables in accordance with still another embodiment.

It is also acceptable to provide an annular ridge section 33f on the internal circumference of the cable passage hole 33c, as shown in FIG. 10. The annular ridge section 33f can be formed in the passage hole using, for example, a screw tapping method. In such a case, the internal diameter D4 of the annular ridge section 33f is smaller than the external diameter D1 of the inner wire 32f. When using the cap member 33, the sliding resistance can be suppressed and excellent sealing performance can be maintained because of less contact area formed between the annular ridge section 33f and the outside surface of the inner wire 32f.

Figure 11:
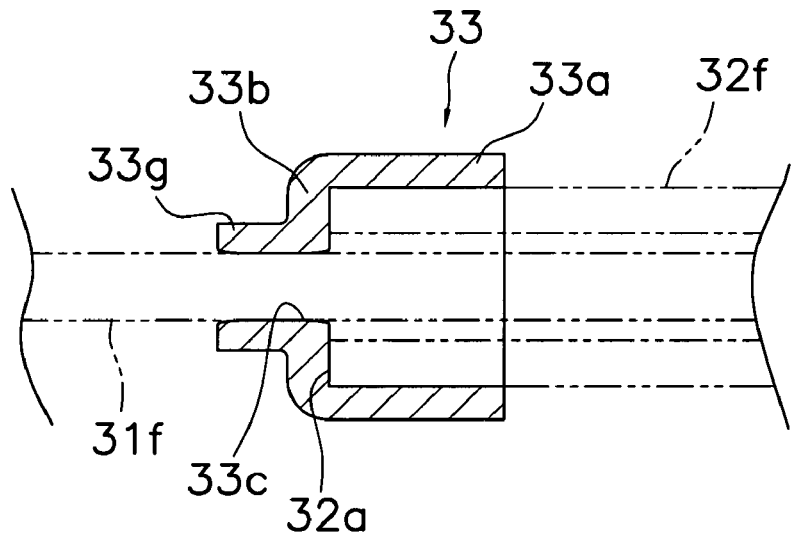
FIG. 11 is a cross sectional view, corresponding to FIG. 7, of a cap member of one of the cables in accordance with still another embodiment.

As shown in FIG. 11, it is also acceptable to provide a generally cylindrical nose section 33g that extends from the outside face of the bottom section 33b, i.e., the opposite face as the face that faces the end part 32a of the inner sheath 32f, and is configured such that the inner wire 31f can pass therethrough, the nose section 33g being configured and arranged to extend from a portion of said outside face that lies radially to the outside of the cable passage hole 33c. The nose section 33g is arranged to be in contact with the inner wire 31f. When using the cap member 33, a high sealing performance can be maintained easily without using grease or another lubricant because the inner wire 31f is covered by the cylindrical nose section 33g.

Figure 12:
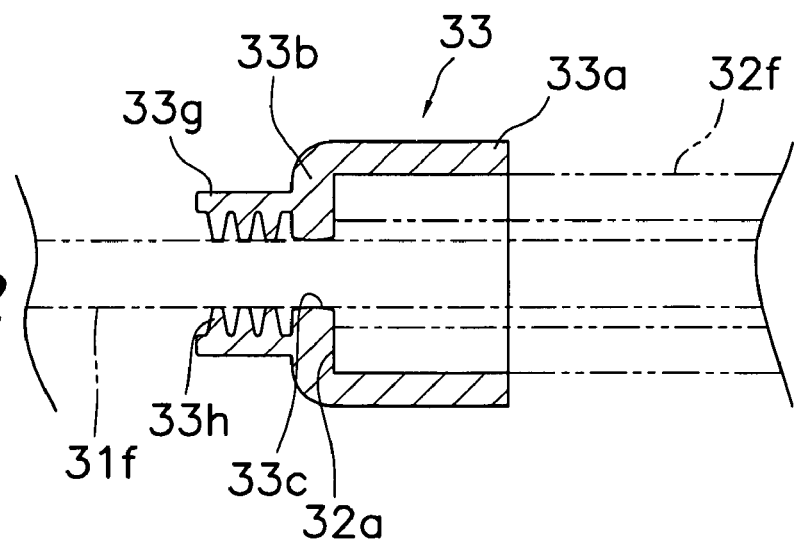
FIG. 12 is a cross sectional view, corresponding to FIG. 7, of a cap member of one of the cables in accordance with still another embodiment.

It also acceptable to configure and arrange the nose section 33g such that a gap exists between the nose section 33g and the inner wire 31f, as shown in FIG. 12. In the example shown in FIG. 12, the labyrinth seal 33g is also provided on the internal surface of the nose section 33g. The labyrinth seal 33h comprises annular protrusions that taper (become narrower) toward the radially inward direction. When using the cap member 33, the sealing performance can be maintained while also suppressing the sliding friction because an appropriate gap is provided. Additionally, the sealing performance can be maintained to an even greater degree while also suppressing the sliding friction by enclosing grease or another lubricant between the nose section 33g and the inner wire 31f.

The labyrinth seal 33h also makes it possible to maintain a high sealing performance while suppressing the sliding friction.

Figure 13:
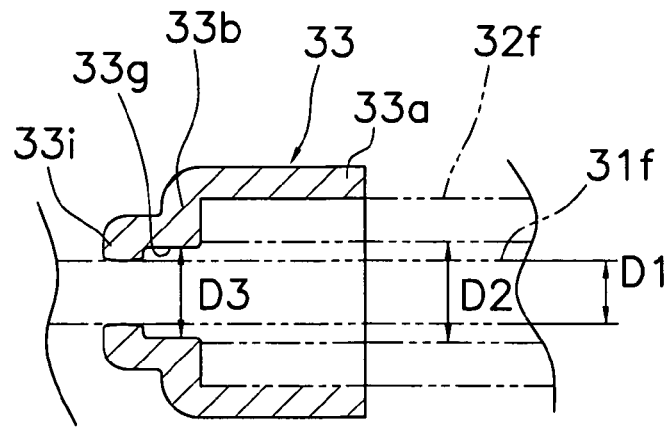
FIG. 13 is a cross sectional view, corresponding to FIG. 7, of a cap member of one of the cables in accordance with still another embodiment.

It is also acceptable to configure the nose section 33g such that only a tip end section 33i thereof contacts the inner wire 31f, as shown in FIG. 13. When using the cap member 33, a lubricant can be easily enclosed inside the nose section 33g and it is easy to position the end part 32a of the inner sheath 32f.

Although in the previously described embodiment the external diameter of the cap member is smaller than the internal diameter of the outer casing such that the cap member can pass through the inside of the outer casing, it is also acceptable for the external diameter of the cap member to be larger than the internal diameter of the outer casing.

Figure 14:
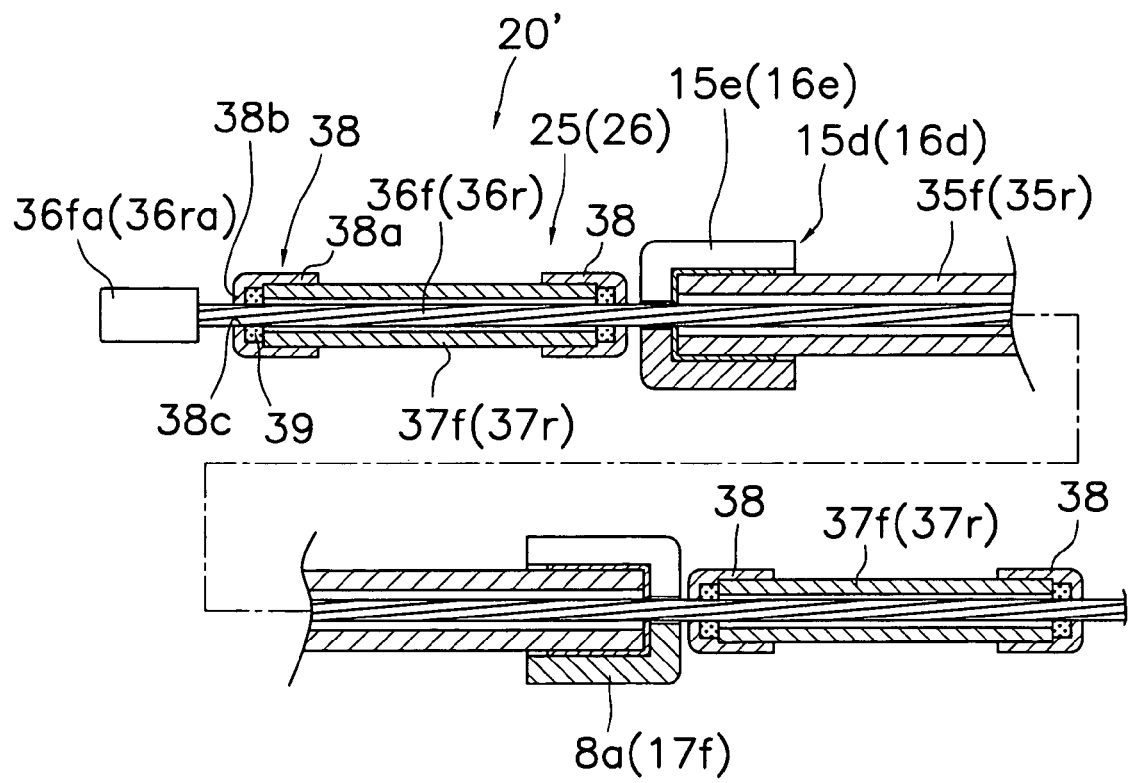
FIG. 14 is a cross sectional view, corresponding to FIG. 6, of a cap member of one of the gear shift cables in accordance with still another embodiment.

Although in the previously described embodiment the external diameter of the inner sheath is smaller than the internal diameter of the outer casing such that the inner sheath can pass through the inside of the outer casing, it is also acceptable for external diameter of the inner sheath to be larger than the internal diameter of the outer casing. In the example shown in FIG. 14, the external diameter of the inner sheath 37f (37r) is larger than the internal diameter of the outer casing 35f (35r). Thus, the inner sheath 37f (37r) cannot pass through the inside of the outer casing 35f (35r). Consequently, separate inner sheaths 37f (37r) are arranged only in the straight sections S2 (S3) of the connecting path L2 (L3). For example, in the case of the front gear shift cable 25, inner sheaths 37f having cap members 38 mounted on both ends thereof are arranged in the straight section S2 and between the outer anchoring part 8a and the inner anchoring part. Similarly, in the case of the rear gear shift cable 26, inner sheaths 37r having cap members 38 mounted on both ends thereof are arranged in the straight sections S3, S4 and between the outer anchoring part 18f and the inner anchoring part 18e. A similar configuration can also be applied to the brake cables 21 and 22.

Since this bicycle cable system 20' can be used with outer casings having the same structure as the outer casings used in conventional cable systems, the inner sheaths 32f (32r), 37f (37r) and the cap members 33 and 38 can be added to a conventional cable system to obtain a new cable system.

In all of the embodiments described herein, the size of the cable passage holes in the cap members can also be made smaller than the internal diameter of the inner sheath(s) and/or larger than, equal to, or smaller than the external diameter of the inner wire.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle cable system comprising:
    an outer casing having a hollow interior passage;
    an inner wire extending through the hollow interior passage of the outer casing;
    an inner sheath being disposed within the outer casing and covering at least a portion of the inner wire that protrudes beyond the outer casing; and
    an inner sheath cap member mounted to an end part of the inner sheath that extends continuously out from the outer casing with the inner wire extending through the inner sheath cap member, the inner sheath cap member being entirely spaced from the outer casing along a direction of the inner wire such that the portion of the inner wire covered by the inner sheath beyond the outer casing is at least partially disposed between the inner sheath cap member and the outer casing along the direction of the inner wire, the inner sheath cap member including
        a cylindrical mounting section mounted on an outside circumference of an end part of the inner sheath; and
        a bottom section formed on one end of the mounting section and having a cable passage hole with the inner wire passing therethrough.

2. The bicycle cable system recited in claim 1, wherein the cable passage hole has an internal width that is smaller than an internal width of the inner sheath.

3. The bicycle cable system recited in claim 2, wherein the cable passage hole has an internal width that is larger than an external width of the inner wire.

4. The bicycle cable system recited in claim 2, wherein the cable passage hole has an internal width that is substantially equal to the external width of the inner wire.

5. The bicycle cable system recited in claim 2, wherein the cable passage hole has an internal width that is smaller than an external diameter of the inner wire.

6. The bicycle cable system recited in claim 1, wherein the inner sheath cap member includes a seal member housing section arranged between the bottom section and the end part of the inner sheath.

7. The bicycle cable system recited in claim 6, wherein the seal member housing section includes a lubricant enclosed inside the seal member housing section.

8. The bicycle cable system recited in claim 6, wherein the seal member housing section has an elastic seal member installed inside the seal member housing section.

9. The bicycle cable system recited in claim 1, wherein the bottom section of the inner sheath cap member contacts the end part of the inner sheath.

10. The bicycle cable system recited in claim 1, wherein the cable passage hole has an annular ridge section provided on an internal circumference of the cable passage hole.

11. The bicycle cable system recited in claim 10, wherein the annular ridge section has an innermost width that is smaller than an external width of the inner wire.

12. The bicycle cable system recited in claim 1, wherein the inner sheath cap member further includes generally cyclindrical nose section extending from an outside face of the bottom section that lies radially to the outside of the cable passage hole such that the inner wire passes therethrough.

13. The bicycle cable system recited in claim 12, wherein the nose section contacts the inner wire.

14. The bicycle cable system recited in claim 12, wherein the nose section is configured and arranged such that a gap between the nose section and the inner wire.

15. The bicycle cable system recited in claim 14, wherein the nose section has a labyrinth seal section provided of an internal surface of the nose section.

16. The bicycle cable system as recited in claim 1, wherein the outer casing includes at least one curved section along a path joining a manually operated part and a cable-operated part together, and
    the inner sheath is arranged in at least one straight section along the path.

17. The bicycle cable system as recited in claim 16, further comprising
    an additional inner sheath cap member arranged on one end of the inner sheath.

18. The bicycle cable system recited in claim 17, wherein the inner sheath is configured and arranged with a gap formed between the outer casing and the inner wire.

19. The bicycle cable system as recited in claim 1, wherein the outer casing includes at least one curved section along a path joining a manually operated part and a cable-operated part together, and
    the inner sheath is arranged to pass through the outer casing and run along substantially the entire length of the path.

20. The bicycle cable system as recited in claim 19, further comprising
    an additional inner sheath cap member arranged on one end of the inner sheath.

* * * * *